United States Patent [19]

Kadono et al.

[11] Patent Number: 5,010,238
[45] Date of Patent: Apr. 23, 1991

[54] AUTOMATIC CASH TRANSACTION SYSTEM AND METHOD

[75] Inventors: Osamu Kadono, Kasugai; Kunio Ushizima, Seto, both of Japan

[73] Assignee: Hitachi, Ltd., Tokyo, Japan

[21] Appl. No.: 304,095

[22] Filed: Jan. 31, 1989

[30] Foreign Application Priority Data

Mar. 18, 1988 [JP] Japan .................................. 63-63278
Apr. 15, 1988 [JP] Japan .................................. 63-93123

[51] Int. Cl.⁵ ............................................. G06F 15/30
[52] U.S. Cl. ..................................... 235/379; 235/454; 902/8; 902/40
[58] Field of Search ................. 235/379, 380, 381, 382, 235/454; 902/8, 37, 40; 364/405, 406, 408

[56] References Cited

U.S. PATENT DOCUMENTS

| | | | |
|---|---|---|---|
| 4,523,330 | 6/1985 | Cain | 902/40 X |
| 4,555,617 | 11/1985 | Brooks et al. | 235/379 |
| 4,580,040 | 4/1986 | Granzow et al. | 235/379 |
| 4,761,542 | 8/1988 | Kubo et al. | 235/379 |
| 4,864,108 | 9/1989 | Hamada et al. | 235/379 |

FOREIGN PATENT DOCUMENTS 62548 4/1980 Japan .
161572 7/1986 Japan .
253597 11/1986 Japan .

Primary Examiner—Stuart S. Levy
Assistant Examiner—Steven M. duBois
Attorney, Agent, or Firm—Pennie & Edmonds

[57] ABSTRACT

An automatic cash transaction system having a plurality of automated teller machines and a supervisory center for supervising the automated teller machines, wherein cash transactions are performed using an identification card storing at least an index representative of the number of a user's account. Each of the automated teller machine includes a guidance display unit for displaying a guidance such as a transaction operation guidance; an optical information reading unit for taking an image of surface information of an identification card; an operation unit for inputting necessary data for a transaction operation, and designating a particular transaction already performed; a data storing unit for storing for each transaction the surface information of an identification card obtained by the optical information reading unit, and the corresponding transaction information entered by using the identification card; and a controller for reading the surface information of an identification card associated with an already performed transaction information designated by the operation unit to display the surface information on the guidance display unit, and upon a transaction failure sending a current transaction information and the surface information of an identification card to the supervisory center. The supervisory center includes a supervisory display unit for displaying thereon transaction information and identification card surface information sent from the controller. An automatic cash transaction method used in the transaction system includes the steps of optically reading an image of surface information of an identification card; storing for each transaction the surface information and the transaction information entered by using the identification card; searching designated transaction information from past transactions already performed; and reading and displaying the surface information of the identification card associated with the designated transaction information.

16 Claims, 13 Drawing Sheets

| DRAW | WELCOME TO OUR BANK | BALANCE |
|---|---|---|
| DEPOSIT | SELECT PROPER KEY FOR TRANSACTION | PASS-BOOK PRINT |

FIG. 10
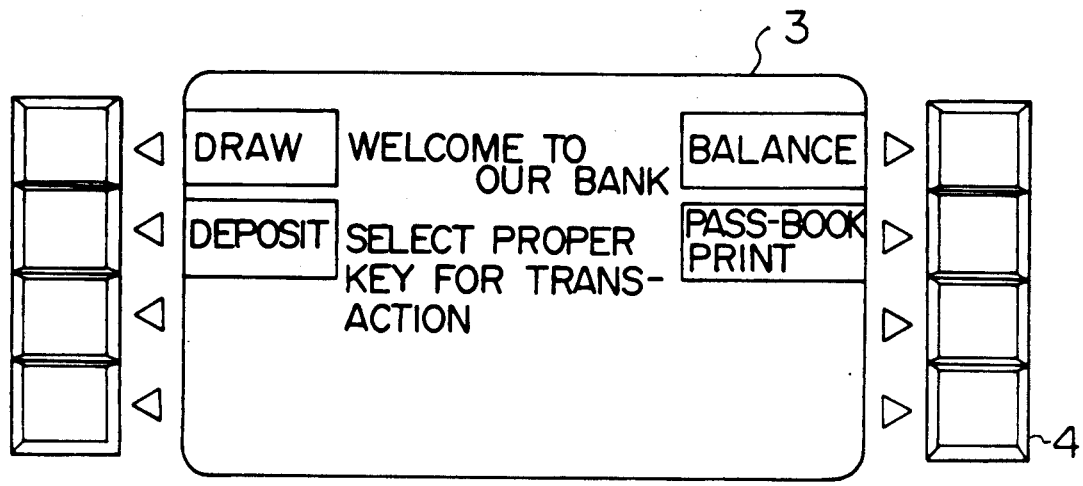
FIG. 11
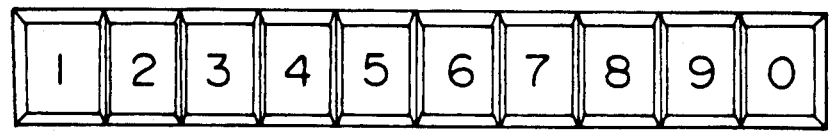

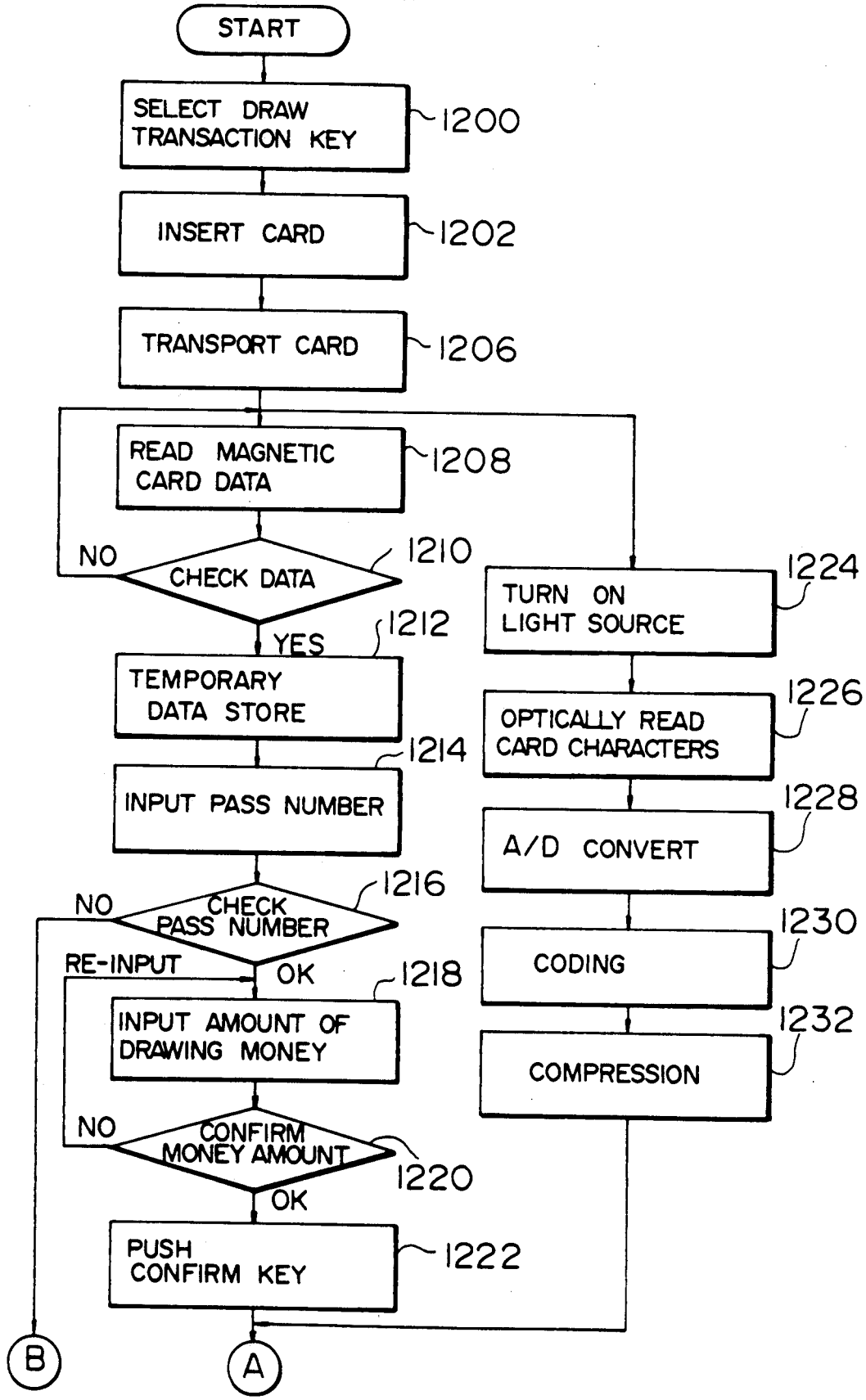

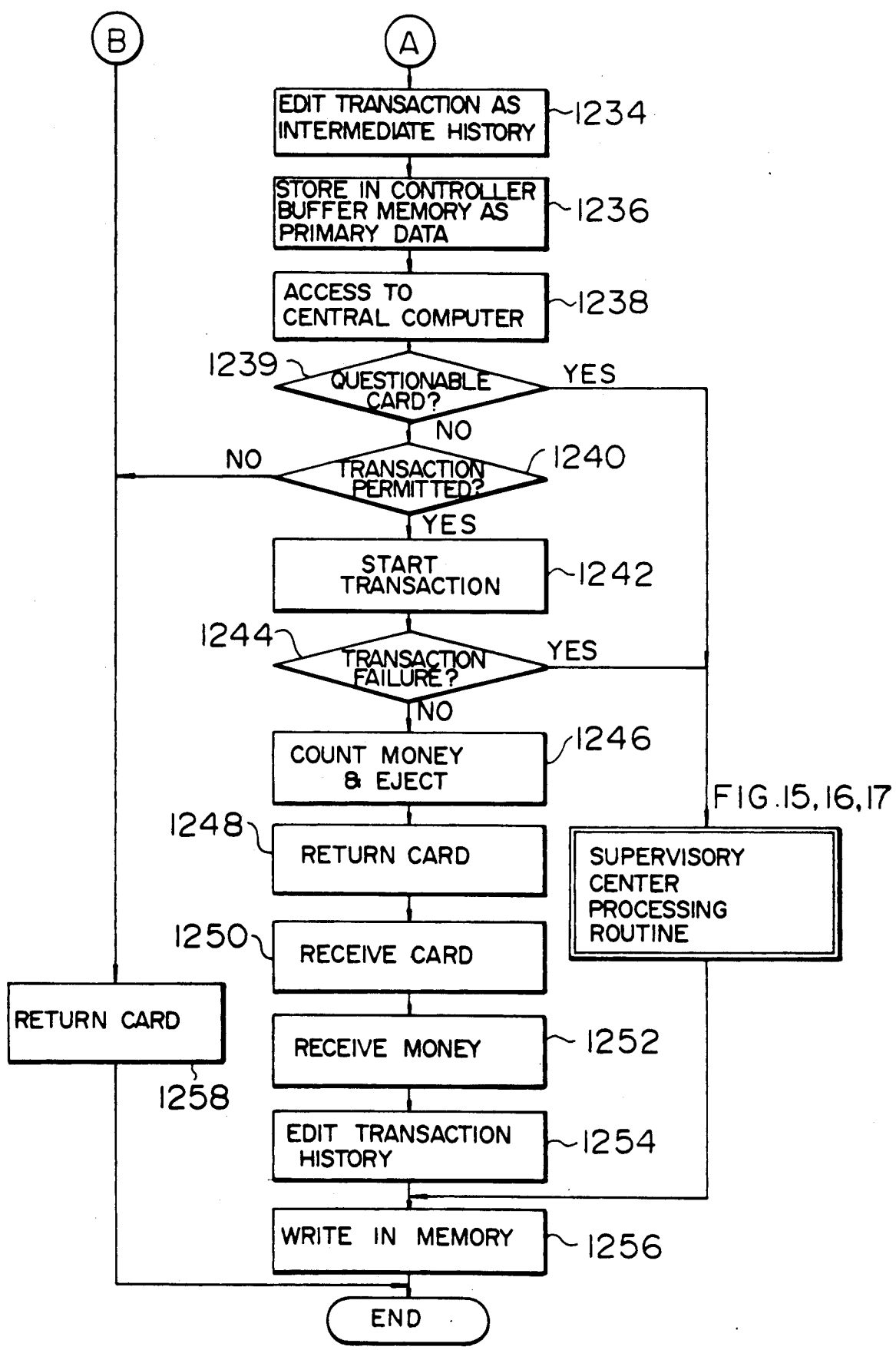

| 310 | 320 | 330 | 340 | 350 | 360 | 370 | 380 | 390 |
|---|---|---|---|---|---|---|---|---|
| BANK NO. | BRANCH NO. | ACCOUNT NO. | TRANS-ACTION TYPE | TRANS-ACTION MONEY AMOUNT | DATE | TIME | NO. OF BANK-IN-CHARGE | IMAGE DATA |

TRANSACTION FORMAT

PROCESS AT ATM UPON TRANSACTION FAILURE

START → DETECT QUESTIONABLE CARD/JAM (1505) → GENERATE FAILURE CODE (1510) → ADD TO PRIMARY DATA (1515) → EDIT DATA (1520) → WRITE IN MEMORY (1525) → SEND TO SUPERVISORY CENTER (1530) → END

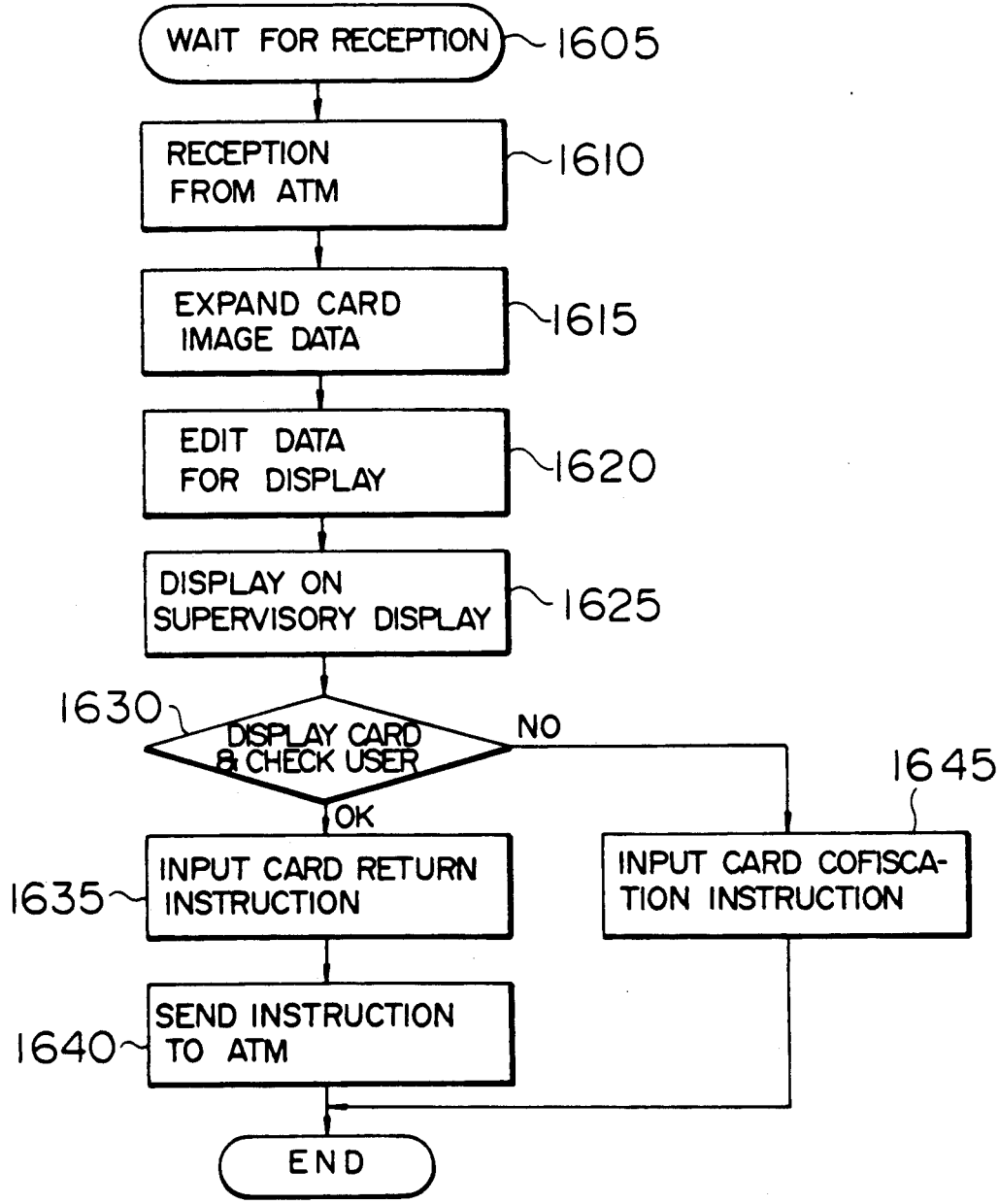

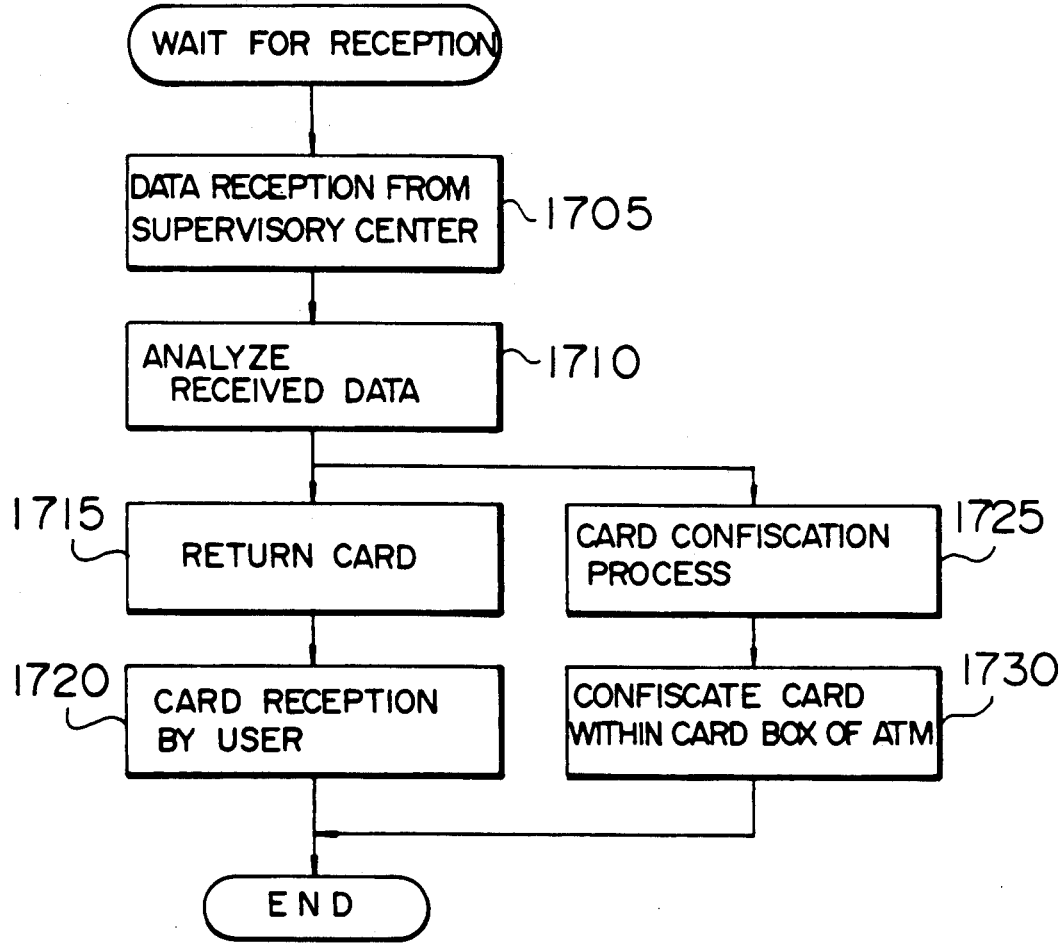

AUTOMATIC CASH TRANSACTION SYSTEM AND METHOD

BACKGROUND OF THE INVENTION

The present invention relates to an automatic cash transaction system and method, the system being composed of a plurality of automated teller machines (hereinafter referred to as ATM) and a supervisory center for supervising the ATMs, wherein cash transactions are performed using card (for example a magnetic identification card) storing at least an index representative of the number of a user's account. More specifically, the invention relates to an automatic cash transaction system and method suitable for use in searching particular transactions already processed, and in recovering a transaction failure under control of a supervisory center commonly located remotely from ATMs.

ATMs of this type are known as disclosed in JP-A-61-161572, JP-A-61-253597, and JP-B-62-548 which teach that the image of characters embossed on the surface of a card is photographed with an electronic camera and stored in a memory of an ATM.

The above prior art aims only at storing the image of characters embossed on a card surface at an ATM, instead of directly using journal sheets. However, this prior art does not concern a function to search a particular transaction trouble from the stored information.

A transaction failure at an ATM should be recovered at its site. However, the stored information has not been utilized positively by a supervisory center remote from ATMs in order to recovery the failure, thus posing a problem in operating self-service ATMs.

SUMMARY OF THE INVENTION

The present invention has been made in consideration of the above problems. It is therefore an object of the present invention to provide an automatic cash transaction system and method capable of readily identifying and checking a transaction trouble by searching, from past transaction records, a particular transaction information and the associated information, such as embossed characters of the card used for the transaction, and by displaying and printing them.

It is another object of the present invention to provide an automatic cash transaction system and method which can smoothly recover a transaction failure at an ATM under control of a supervisory center which supervises a plurality of ATMs generally located remotely therefrom, and is suitable for the operation of confiscating a questionable card within an ATM or returning a card to the user.

The above objects are achieved by the automatic cash transaction system of this invention which comprises a plurality of automated teller machines and a supervisory center for supervising the automated teller machines, wherein cash transactions are performed using an identification card storing at least an index representative of the number of a user's account, each automated teller machine comprising guidance display means for displaying a guidance such as a transaction operation guidance; optical information reading means for taking an image of surface information of an identification card; operation means for inputting necessary data for a transaction operation, and designating a particular transaction already performed; data storing means for storing for each transaction the surface information of an identification card obtained by optical information reading means, and the corresponding transaction information entered by using the identification card; and control means for reading the surface information of an identification card associated with an already performed transaction information designated by operation means to display the surface information on guidance display means, and upon a transaction failure sending a current transaction information and the surface information of an identification card to the supervisory center.

The supervisory center comprises supervisory display means for displaying thereon transaction information and identification card surface information sent from control means.

An automatic cash transaction method used in the transaction system comprises optically reading an image of surface information of an identification card; storing for each transaction the surface information and the transaction information entered by using the identification card; searching designated transaction information from past transactions already performed; and reading and displaying the surface information of the identification card associated with the designated transaction information.

BRIEF DESCRIPTION OF THE DRAWINGS

FIG. 10 exemplarily shows the guidance display constructed of a cathode ray tube and the operation panel constructed of a ten-key and function keys;

FIG. 11 shows an example of a supervisory display;

FIGS. 12A and 12B are flow charts illustrating a cash drawing operation;

FIG. 16 is a flow chart illustrating a sub-routine performed by a supervisory center upon occurrence of a transaction failure; and FIG. 17 is a flow chart illustrating a sub-routine performed in response to an instruction from the supervisory center upon occurrence of a transaction failure.

DESCRIPTION OF THE PREFERRED EMBODIMENT

Figure 1:
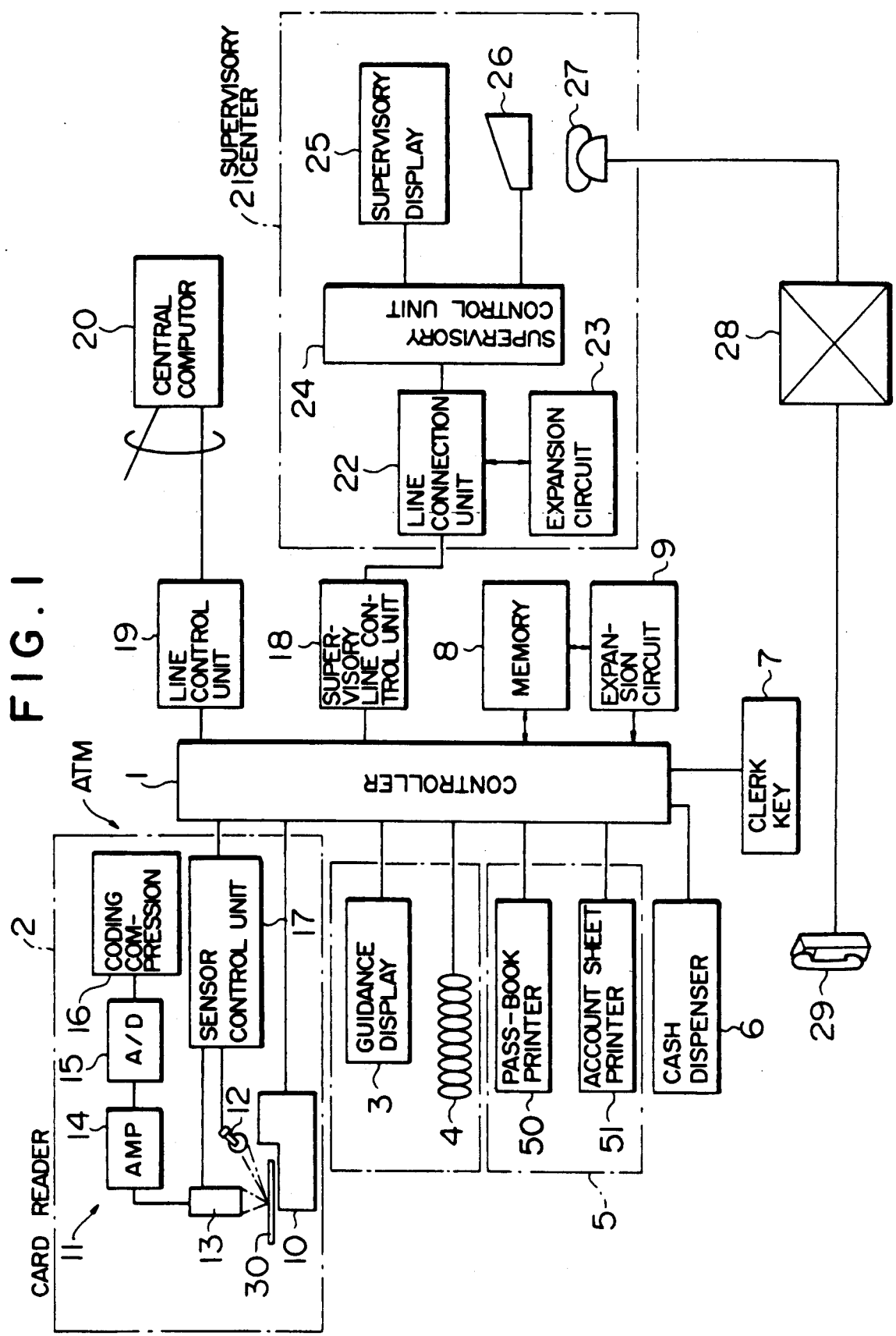
FIG. 1 is a block diagram showing the overall arrangement of an embodiment of the automatic cash transaction system according to the present invention.
Figure 2:
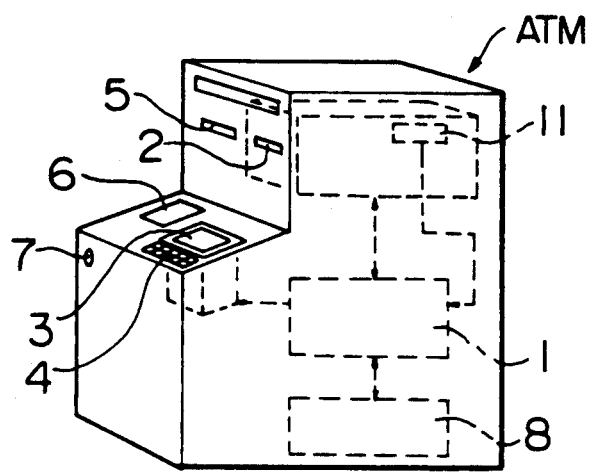
FIG. 2 schematically shows the outer appearance and internal structure of an ATM shown in FIG. 1.
Figure 3:
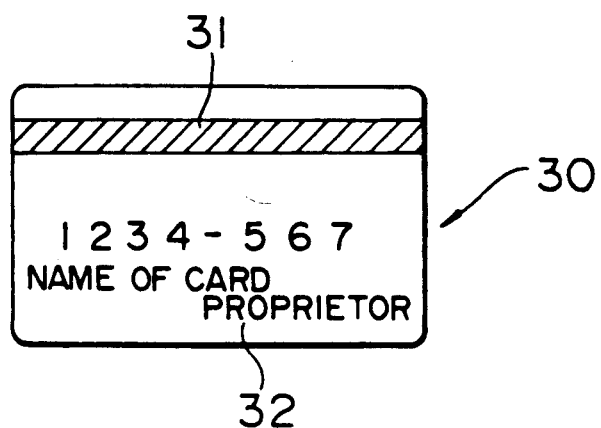
FIG. 3 shows an example of the top surface of a card used in the embodiment.

An embodiment of the invention shown in the accompanying drawings will now be described. The block diagram of FIG. 1 shows the overall structure of the automatic cash transaction system embodying the present invention, the schematic diagram of FIG. 2 shows the outer appearance and inner structure of an ATM used with the system, and FIG. 3 shows an example of a card 30.

An ATM is constructed of a card reader 2, guidance display 3, operation panel 4, account-sheet/ pass-book printer 5, cash dispenser 6, clerk key 7, and memory 8 with expansion circuit 9, all connected to a controller 1.

The card reader 2 is constructed of an optical reader 11 and a magnetic stripe reader/writer 10. The optical reader 11 is constructed of a light source 12 for applying light to a card 30, image sensor 13 for taking an image of surface information of the card 30, such as embossed characters 32, sensor control unit 17 for controlling the sensor 13 and the light source 12, amplifier 14 for amplifying a sensor output, A/D converter 15 for A/D converting the amplified output, and coding compression circuit 16 for data compression of an output from the A/D converter. The magnetic stripe reader/writer 10 reads card data recorded as magnetic stripes 31 representative of such as account number, pass number and the like, and writes if necessary data in the card or change the data already recorded.

Using the card reader 2, it is possible for the controller 1 to fetch the data recorded as the magnetic stripes 31 in the card 30 inserted into an ATM and the image data of the characters 32 embossed on the card 30, and rewrite the magnetic stripes 31 if necessary.

The guidance display 3 and operation panel 4 in combination function as input/output means for the controller 1 (input/output means is shown in FIG. 1 as separate devices 3 and 4 for clearly indicating the input/output functions). The guidance display 3 and operation panel 4 may be constructed of, as shown in FIG. 10, a display tube such as a cathode ray tube, a ten-key and function keys, or may be constructed, as shown in FIGS. 4 to 9, of a touch panel serving as both message or guidance display means and input terminal means. As will be detailed later in the operation, display examples on a touch panel are shown in FIGS. 4 to 7 for a normal transaction by a user and in FIGS. 8 and 9 for a clerk operation.

The account-sheet/pass-book printer 5 is constructed of a pass-book printer unit 50 and account sheet printer unit 51 to print transaction content supplied from the controller 1 on an account sheet or pass-book. The cash dispenser 6 pays/receives money in notes or coins. The clerk key 7 is not used during an ordinary cash transaction by a customer, but is used by a clerk for maintenance or service of the machine, search of transaction records upon occurrence of transaction failure, and the like. The controller 1 of ATM is provided with the expansion circuit 8 for data expansion and with the memory 8. Magnetic stripe data read by the magnetic stripe reader/writer 10 are stored in the memory 8 with the same data length as that when read, and read by the controller 1 when necessary. Image data read by the optical reader 11 are compressed by the coding compression circuit 16 and stored in the memory 8 together with the corresponding transaction data. In reading the compressed image data of the memory 8, they are expanded by the expansion circuit 9 to the original data length suitable for display on the guidance display 3 and thereafter, supplied to the controller 1.

In the present embodiment, an ATM is connected to a central computer 20 via a line control unit 19. Stored in the central computer 20 are data such as past transaction history and pass numbers of respective accounts, and account numbers or the like of questionable cards such as stolen cards as occasion arises. Transaction data are transferred between an ATM and the central computer 20 via the line control unit 19 each time a transaction is performed at the ATM, to thus renew the transaction history of the account stored in the central computer 20 and store the transaction record and its associated image data of the card 30 in the memory 8 of the ATM.

A supervisory center 21 is further provided as a constitutional element of the cash transaction system, the supervisory center 21 being connectable to a plurality of ATMs (only one ATM is shown for simplicity) for control thereof. The supervisory center 21 is constructed of a supervisory control unit 24, supervisory display 25, keyboard 26, line connection unit 22 and expansion circuit 23, and is connectable to each ATM via a supervisory line control unit 18. Upon input from the keyboard 26 of the supervisory center 21, a particular ATM can be accessed to display a transaction record on the supervisory display 25 and monitor it. A transaction failure including a use of a questionable card, occurrence of a jam or the like is notified to the supervisory center 21 from the controller 1 of an ATM via the supervisory line control unit 18. Displayed on the supervisory display 25 as the transaction failure are, for example, an account number, pass number entered by a user from the operation panel, transaction type and the like, and the compressed image data of the embossed characters 32 of the card after expanded to the original data length by the expansion circuit 23.

Telephone sets 27 and 29 connectable via an exchange 28 are provided each at the supervisory center 21 and an ATM (only a pair of set 29 and ATM is shown herein). As will be detailed in the operation, a supervisory person at the supervisory center 21 can talk with a user with transaction failure over telephone.

The ordinary transaction procedure by the automatic cash transaction system will be described with reference to the flow charts shown in FIGS. 12A and 12B. A user selects a cash drawing transaction (DRAW) from the guidance display on the touch panel exemplarily shown in FIG. 4 and touches it (step 1200). Next, a card 30 is inserted into the card reader 2 (step 1202). The inserted card 30 is transported (step 1206) to read data such as the pass number, account number and the like by means of the magnetic stripe reader/writer 10 (step 1208) and check if they are of a predetermined data format or not (step 1210). If affirmative, the read-out data are temporarily stored in a buffer memory (not shown) of the controller 1 (step 1212). A pass number entered by using the ten-key of the touch panel (step 1214) is checked (step 1216). This check is carried out, after the user touches a confirmation key among the function keys on the touch panel, by the controller 1 through comparison between the entered pass number and that read from the magnetic card 30. Such a check may be made through comparison with the pass number stored in the central computer 20 together with the transaction history, at the time of data transference to an from the central computer 20.

Figures 4, 5:
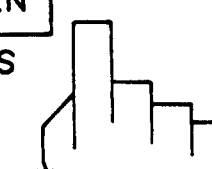
FIGS. 4 to 7 show guidance examples on a touch panel.
Figure 6:
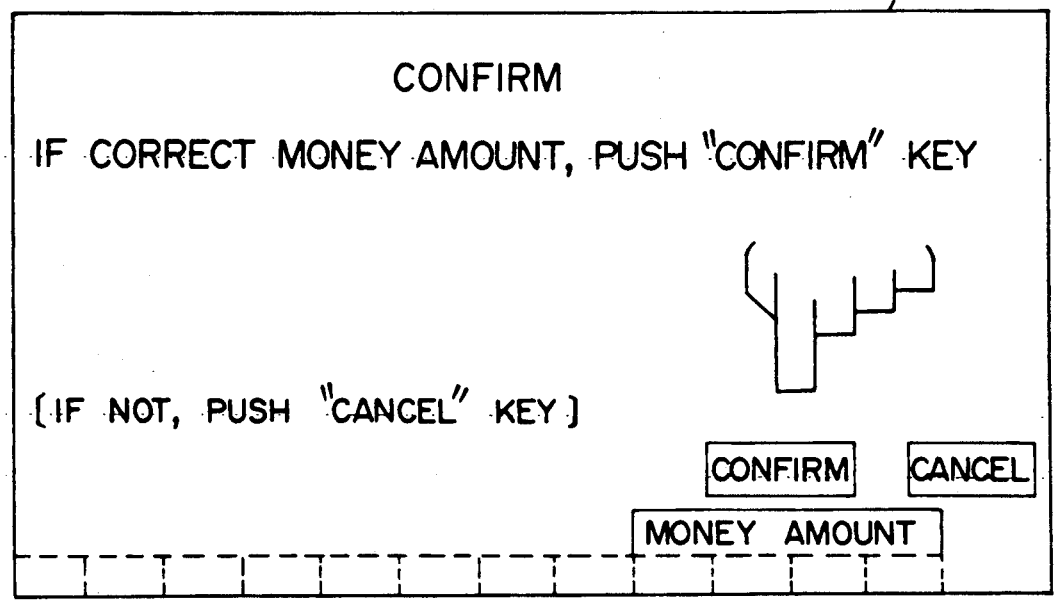
Figure 7:
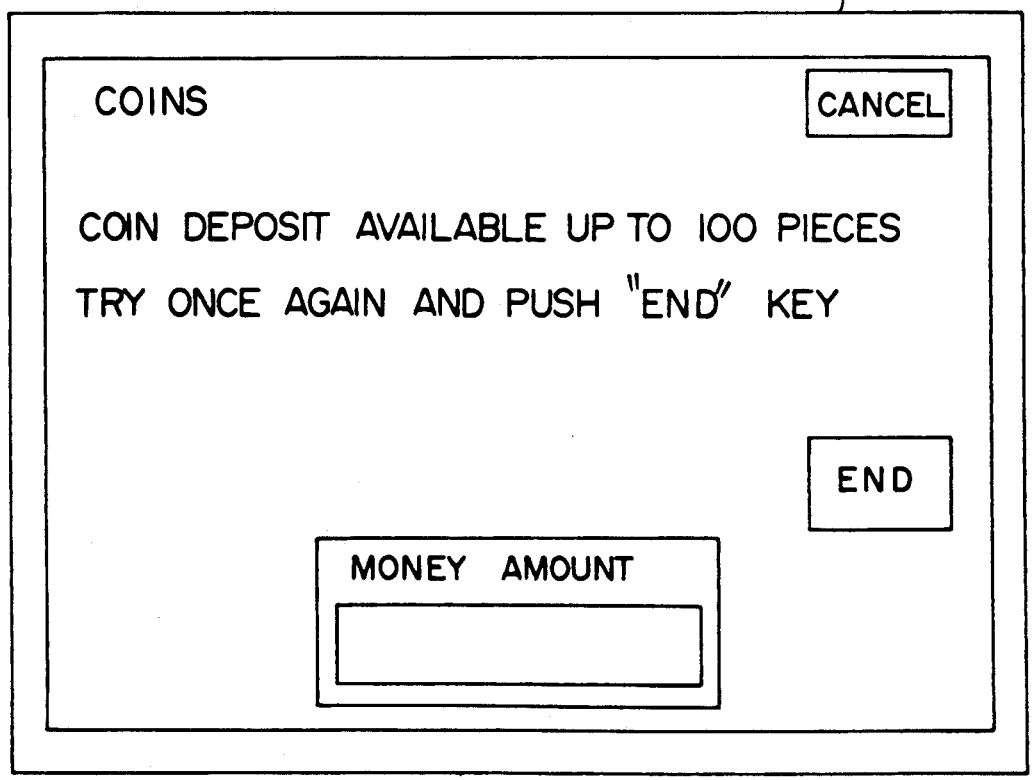

After checking the pass number, the guidance display shown in FIG. 5 is given on the touch panel so that the user enters the amount of money to be drawn, by using the ten-key displayed thereon (step 1218), and confirms the amount at the guidance display shown in Fig. 6 (step 1220) by touching the confirmation key (step 1222). In parallel with the operations at steps 1208 to 1222 including reading data recorded as magnetic stripes, checking pass number and entering the money amount, the image of information such as embossed characters formed on the surface of the card 30 is taken by the optical reader 11. Specifically, the light source 12 is turned on (step 1224) to make the image sensor 13 optically read the surface of the card 30 (step 1226). The read-out information is subjected to A/D conversion and coding compression (steps 1228 to 1232) and thereafter inputted to the controller 1. The operation of the coding compression circuit 16 can be realized easily by using the Hofmann coding method which is commonly applied to facsimile apparatus and the like. The account number obtained from the magnetic data, entered pass number, money amount, optical image data are edited as an intermediate history of the transaction (step 1234) and stored as primary data in a buffer memory (not shown) of the controller 1 (step 1236).

The controller 1 of the ATM then accesses the central computer 20 via the line control unit 19 (step 1238) to read the transaction history of the account now concerned, compare it with the primary data stored in the buffer memory of the controller 1, and check the account balance, the card if it is a stolen card or not, and the like. If the card is not a stolen card, the flow advances to the next judgement block. However, if the card is a stolen card as recorded in the central computer 20, the flow jumps to the supervisory center process routine to the described later with reference to FIGS. 15 to 17 (step 1239). In the former case, it is determined if the transaction is permitted or not (step 1240). If affirmative, the central computer 20 sends a transaction permission code, data still not printed on the pass-book, and if necessary a message sentence to be printed on an account sheet. Thereafter, the ATM starts a transaction procedure (step 1244). If there is no trouble such as a jam of notes in the ATM, the number of notes and/or coins are counted to pay out them from the cash dispenser 6 (step 1246). The card 30 in the card reader 2 is transported in the direction opposite to the case of reading it and returned to the user (step 1248). After the card 30 is received by the user (step 1248) and the notes and/or coins are received (step 1252), the controller 1 instructs the central computer 20 to renew the account balance and the like based on the edited primary transaction data and store them together with the image data of the card 30 in the memory 8 as the transaction journal of the account now concerned.

If a transaction failure such as a jam occurs at step 1244, the flow advances to the sub-routine which will be described in detail along with the description of the operation of the supervisory center 21. If the pass number does not coincide with the read-out pass number at step 1216 (in this embodiment, although the card is returned to the user if the erroneous input is made even once, it may be arranged such that a pass number is allowed to enter again) or if the central computer 20 judges the transaction as not permissible due to insufficiency of the account balance, the card 30 is returned to the user and the transaction is temporarily terminated. In this case, the user can resume the transaction from the first step thereof. As above, according to the present embodiment, each time a transaction is completed at an ATM, the transaction history of the account in the central computer 20 is renewed and stored as the transaction journal in the memory 8 together with the compressed, digitalized image data of the card.

Next, the method of searching a past transaction record which has fallen into transaction trouble between a user and a bank will be described with reference to FIGS. 13A, 13B and 14.

Figures 14, 15:
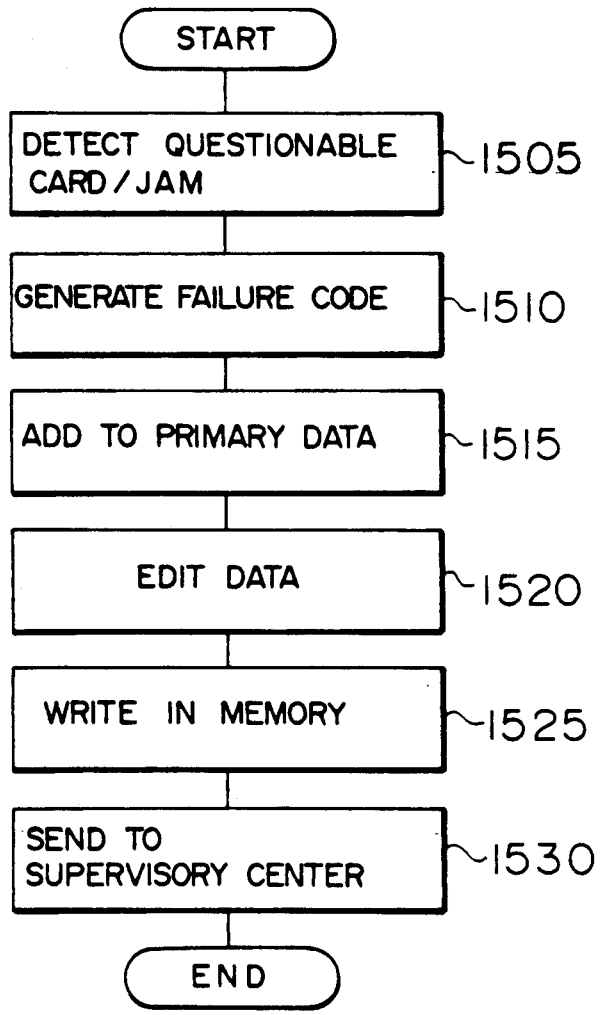
FIG. 14 shows a format of a transaction record stored in a memory.
FIG. 15 is a flow chart illustrating a subroutine performed by an ATM upon occurrence of a transaction failure.

FIG. 14 shows an example of a transaction journal indicating one transaction content stored in the memory, the journal content including a bank number 310, branch number 320, account number 330, transaction type code 340, transaction money amount 350, transaction date 360, transaction time 370, bank-in-charge number 380 and card image data 390. The transactions are sequentially stored in the memory in the format shown in FIG. 14.

Figures 8, 9:
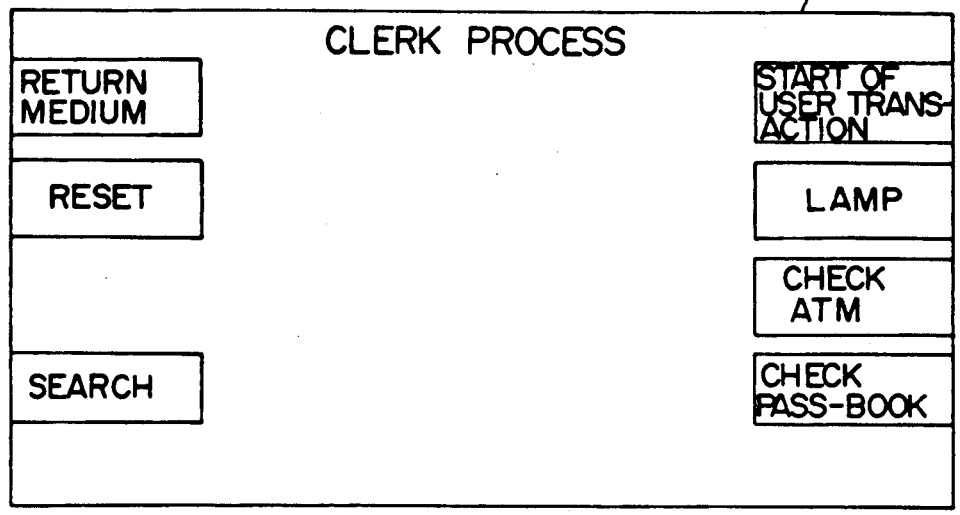
FIGS. 8 and 9 show guidance examples on a touch panel for use by a clerk.
Figure 13A:
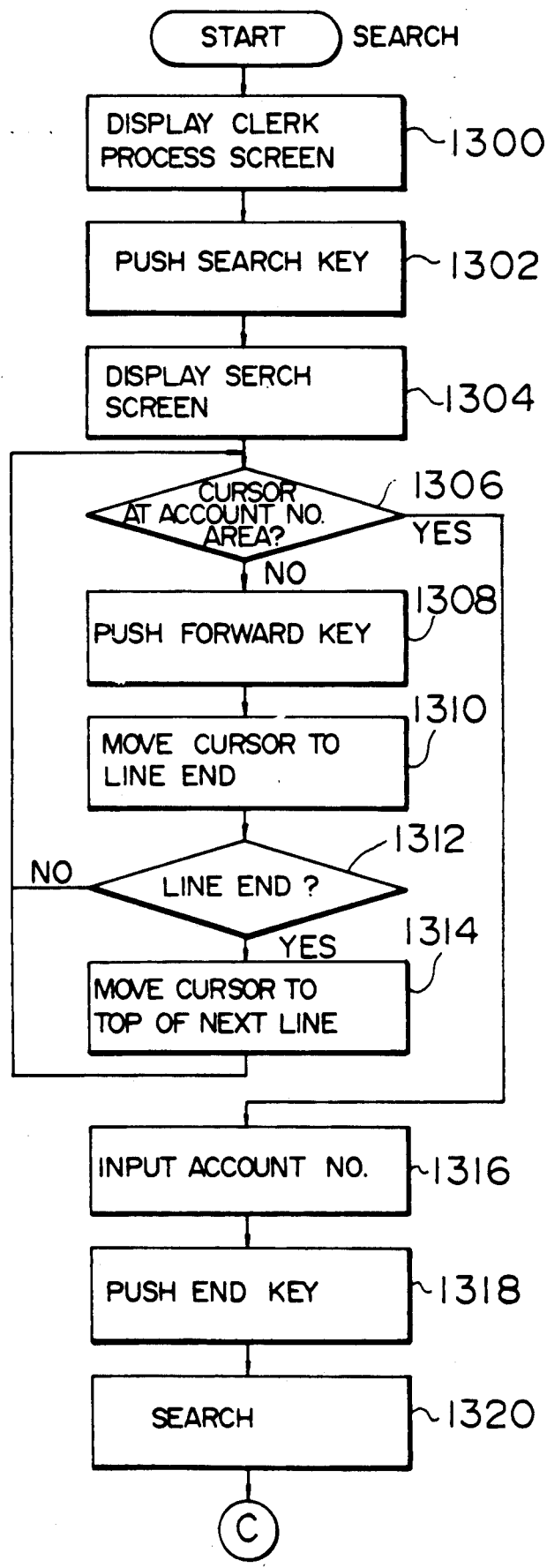
FIGS. 13A and 13B are flow charts illustrating a search operation.
Figure 13B:
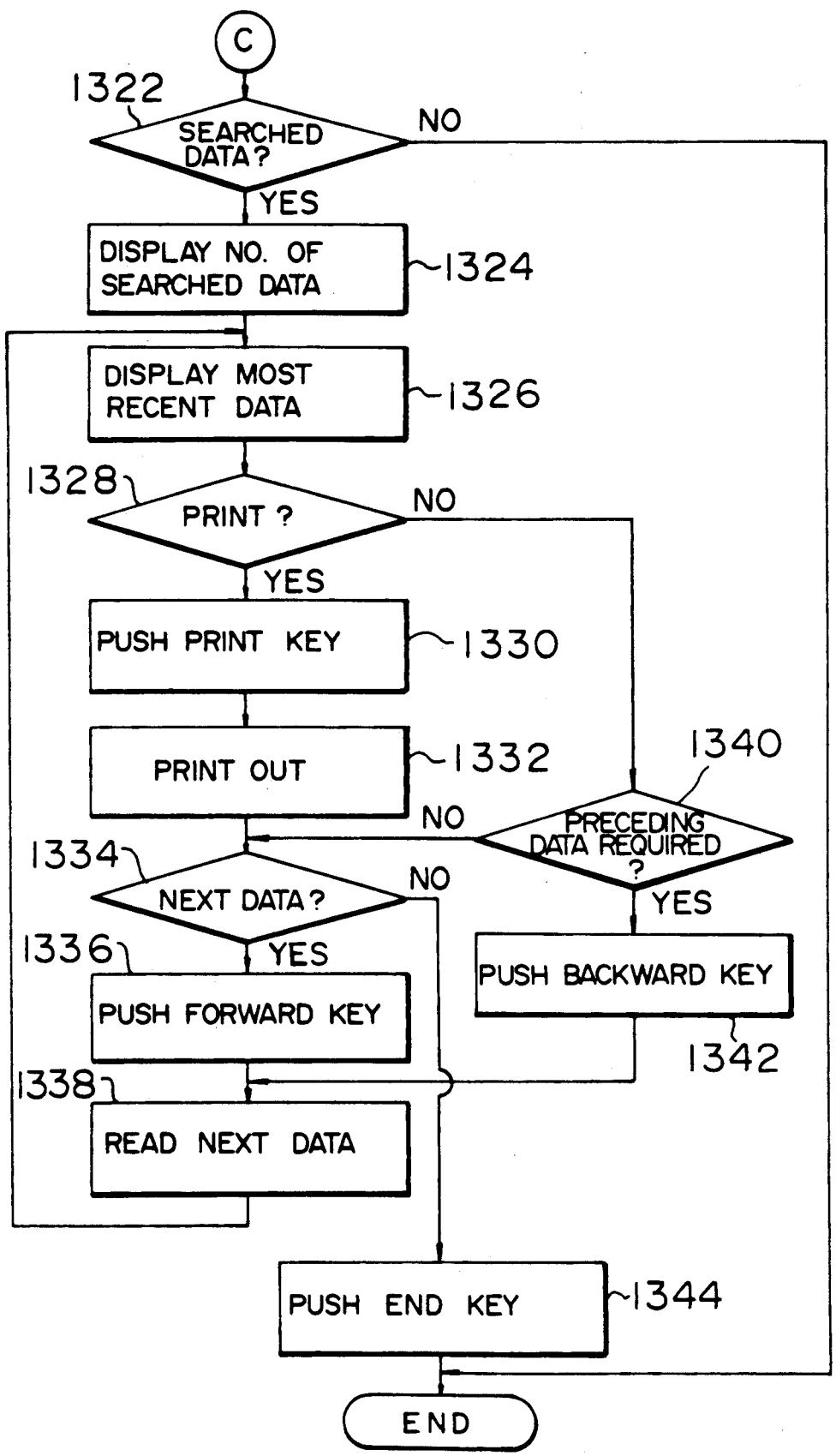

FIGS. 13A and 13B are flow charts showing the search procedure for past transactions. For searching a past transaction trouble, a bank clerk actuates the clerk key 7 mounted on the front panel of the ATM to display a clerk process display shown in FIG. 8 on the touch panel (step 1300). The clerk then touches a search function key (step 1302) to display a search display shown in FIG. 9 (step 1304). The search display of FIG. 9 is blanked at various transaction parameters or key works such as data, bank-in-charge number and the like. Upon input of one or more parameters identifying a particular transaction account, one or more sets of transaction data are arranged to be searched. The search key words include the bank number, branch number, account number, transaction type code, transaction money amount, date, time, bank-in-charge number and the like.

The search procedure will be described hereinbelow assuming that an account number is given for identifying the past transactions. First, the cursor is moved to the account number area (steps 1306 to 1314) to input the account number (step 1316). Upon touching an end key (step 1318), a search will start (1320). If there are transaction data corresponding to the entered account number, the number of past transactions is displayed (step 1324) and thereafter, the most recent transaction data among a plurality of past transactions are displayed (step 1326). This display is performed by filling all the blanked parameters shown in FIG. 9 and by giving the image of the card 30 at a predetermined blank portion of Fig. 9. Therefore, by checking the displayed embossed characters or the like, it becomes clear at once if the transaction was performed by using a correct card or a deceptive card.

If a hard copy of the displayed data, i.e., the transaction journal, is desired, a print key is touched to obtain a print thereof from the account sheet printer 31 (steps 1328 to 1332). In printing out the hard copy, the data in the format as shown in FIG. 14 are edited to output a print having a format as shown in FIG. 9. Specifically, the numerical data and compressed card image data of the transaction journal respectively stored in the memory 8 are read out therefrom and edited so as to print them in a format as shown in FIG. 9. Prior to editing, the compressed card image data are subjected to expansion by the expansion circuit 9 in the manner opposite to the above-described compression process, the expansion process being performed by the similar technique to that used with facsimile apparatus and the like. If the next recent data to the data displayed at step 1326 are desired after the above process, a forward key is touched to read them (steps 1334 to 1338), following again steps 1326 to 1332 to obtain a print thereof. If a hard copy is not desired at step 1328 and the transaction data just before the displayed data are desired to be displayed again, then steps 1340, 1342 and 1338 follow. After printing, if the next data are not necessary, the flow advances to step 1344 to touch the end key and complete the search. In the above example, although it has been assumed that only the account number is given, it is apparent that other parameters even without the account number may be used for identifying past transactions. In such a case, the larger the number of parameters is, the less the number of corresponding transactions becomes so that a particular transaction to be searched can be more readily identified. The search flow as exemplarily described above is carried out in the usual manner as generally applied to computers. Specifically, if an account number only is entered as the search parameter, all the transaction records stored sequentially in the memory 8 in the order of transactions with the format shown in FIG. 14 are temporarily read out in the buffer of the controller 1. Then, the addresses of the transactions having the same account number and the number of such transactions stored in a specific area of the buffer. Thereafter, as described in the above flow, the number of transactions having the same account number is displayed and the most recent transaction is edited and displayed. Similarly, if a plurality of parameters are entered for identifying a particular transaction, all the transactions are read out from the memory 8 and temporarily stored in the buffer. Thereafter, the addresses of the transactions having the same parameters and the number of such transactions are listed in the specific area of the buffer.

As stated above, the content of a particular transaction as well as the embossed characters of the card can be printed out without necessity of printing out all transactions as was conventionally performed. Therefore, the time required for search becomes short. Search can be easily conducted only by key touch operation without preparing journal sheets as conventional. A hard copy can be obtained, if desired, to check the transaction for reference sake. The data for transactions are subjected to digital coding and compression to thereby make the data quantity very small and hence the memory 8 capacity of an ATM always sufficient for a relatively large volume of transaction records. The data may be stored also in the memory of the central computer 20 as occasion arises or may be stored in an optional storage medium such as a flexible disk provided in addition to the central computer memory.

Next, the operation of the supervisory center for the case of a transaction failure at an ATM will be described. If it is judged as a questionable card at step 1239, or as a jam at step 1244, of the normal cash drawing transaction shown in FIGS. 12A and 12B, such transaction failure is processed in accordance with the supervisory center processing routine shown in the flow charts of FIGS. 15 to 17. Upon judgement as a questionable card at step 1239, the ATM generates a failure code indicating a questionable card (steps 1505 and 1510). Upon judgement as a jam at step 1244 by means of a jam sensor (not shown) mounted on the cash dispenser 6 (step 1505), the ATM generates a failure code indicating a jam (step 1510). The generated failure code indicating a questionable card or a jam is added to the above-described primary data (step 1515). The data thus obtained are edited in the format shown in FIG. 14 (step 1520) and sent to the supervisory center 21 via the supervisory line control unit 18.

After completion of the above routine, the processes shown in FIG. 16 are executed by the supervisory center 21. Specifically, in the flow at the supervisory center 21, when the data are sent from an ATM (step 1610), the card image data within the primary data sent from the ATM are subjected to an expansion process by the expansion circuit 23 (step 1615) and edited for display thereof (step 1620) on the supervisory display 25 as shown in FIG. 11. At the supervisory center 21, while observing the transaction content, failure code and the image of the card 30 all displayed on the supervisory display 25, a supervisory person at the supervisory center 21 waits for a telephone call from the user via the telephone sets 27 and 28, or calls the user to check if he or she is a correct proprietor of the card, based on the inquired name or other facts (step 1630). Upon this user check, if the transaction failure belongs to a read error of the magnetic stripes of the card 30 or other system errors, the supervisory person determines to return the card to the user by using the keyboard 205 (step 1635) and notifies such effect to the ATM (step 1640). If it is judged that the card is s stolen or forged card (step 1630), then a card confiscation instruction is entered by means of the keyboard 205 (step 1645).

After completion of the above processes at the supervisory center 21, the ATM executes the routine shown in FIG. 17 in response to data reception from the supervisory center 21. Specifically, in response to the data reception from the supervisory center 21 (step 1705), the data are analyzed (step 1710). If the data indicate a card return instruction because of a correct card, a card return process is performed (step 1715) to return it to the user via the card reader 2 (step 1720). On the other hand, if the data indicate a card confiscation instruction because of a stolen or forged card, a card confiscation process is performed (step 1725) to confiscate it within a card confiscation box (not shown) provided in the ATM. In both the cases, the ATM causes the executed process result to be stored in the memory 8 as the transaction history. The stolen or forged card can thus be confiscated without attracting user's attention so that the authorities concerned can be informed of such a event, a photograph of the user can be taken, or other necessary actions can be made.

We claim:

1. An automatic cash transaction system comprising a plurality of automated teller machines and a supervisory center for supervising the automated teller machines, wherein cash transactions are performed using an identification card which stores an index representative at least of the number of a user's account, each of said plurality of automated teller machines comprising:

guidance display means for displaying a guidance such as a transaction operation guidance;

optical information reading means for taking a surface image information of said identification card as a digital information;

operation means for inputting necessary data for a current transaction operation, and designating a particular past transaction;

data storing means for digitally storing for each transaction the surface image information of said identification card obtained by said optical information reading means and said corresponding transaction information including said data inputted from said operation means as an electronic journal; and control means for reading out the surface image information of an identification card associated with a past transaction information stored in said data storing means designated by said operation means to display said surface information on said guidance display means, and capable of sending a current transaction information including said data inputted from said operation means and the surface image information of said identification card to said supervisory center when said control means detects a transaction failure; and said supervisory center comprising supervisory display means for displaying thereon said current transaction information and identification card surface information sent from said control means, and supervisory control means for reading out said electronic journal of past transaction stored in said data storing means to display on said supervisory display.

2. An automatic cash transaction system according to claim 1, wherein said automated teller machine comprises means for reading the index stored in said identification card, and said control means executes the transaction of an account indentified by the index read by said index reading means.

3. An automatic cash transaction system according to claim 1, wherein said control means displays said electronic journal including past transaction on said guidance display means designated by said operation means.

4. An automatic cash transaction system according to claim 1, wherein said automated teller machine further comprises print means for printing the content displayed on said guidance display means.

5. An automatic cash transaction system according to claim 1, wherein said card is a magnetic card, and the index is recorded as magnetic stripes in said card.

6. An automatic cash transaction system according to claim 1, wherein said automated teller machine is connected to file memory means which stores therein a transaction history for each account, and said control means renews each transaction information with a most recent transaction and the surface image information of a card to be stored in said data storing means.

7. An automatic cash transaction system according to claim 2, wherein said control means detects if the index stored in a card coincides with the inputted data from said operation means to start a transaction and stores the transaction result together with the surface image information of the card in said data storing means.

8. An automatic cash transaction system according to claim 1, wherein said supervisory control means either confiscates or returns the card within said automated teller machine to a user when said transaction failure detected by said control means is communicated to said supervisory center.

9. An automatic cash transaction system according to claim 1, wherein said control means detects said transaction failure when said index stored in said card coincides with a registered failed account number.

10. An automatic cash transaction system according to claim 1, wherein said control means detects said transaction failure when said index stored in said card is inconsistent with the data inputted from said operation unit.

11. An automatic cash transaction system according to claim 1, further comprising a telephone line between said supervisory center and said automated teller machine for said supervisory center to communicate with the user and/or the automated teller machine.

12. An automatic cash transaction system according to claim 1, wherein designation of a particular past transaction is executed by inputting an account number from said operation unit.

13. An automatic cash transaction method for an automatic cash transaction system comprising at least one automated teller machine and a supervisory center for supervising the automatic teller machine, wherein cash transactions are executed using an identification card storing an index representative at least of the number of a user's account, said method comprising the steps of:

optically reading an image of surface image information of said identification card used for a cash transaction;

storing for each transaction the surface image information and a transaction information including a necessary data inputted during said transaction by the user as an electronic journal;

detecting for a transaction failure during said cash transaction;

searching the electronic journals which have been previously stored in past transactions for retrieving a designated electronic journal corresponding to the index stored in said card when said transaction failure is detected; and reading out said electronic journal including said surface image information of said identification card with the past transaction information and displaying the read-out information on a display in a supervisory center when said transaction failure is detected.

14. An automatic cash transaction method according to claim 13, further comprising the steps of:

interrupting said cash transaction in response to said detection of said transaction failure;

sending a current transaction information together with said surface image information of said identification card used during said transaction to said supervisory center;

displaying said surface image information with said transaction with said transaction on said display in said supervisory center;

sending instruction to said automatic teller machine to either confiscate or return the identification card within said automatic teller machine to the user from said supervisory center.

15. An automatic cash transaction method according to claim 13, wherein said transaction failure is detected by;

comparing the index stored in said identification card with preestablished failed account numbers, said transaction failure is detected when said index number coincides with any of the failed account numbers.

16. An automatic cash transaction method according to claim 13, wherein said transaction failure is detected by:

inputting identification number by the user to the automated teller machine;

comparing the index stored in said identification card with inputted identification number, said transaction failure is detected when said index number is inconsistent with the inputted identification number.

* * * * *